United States Patent Office 2,798,377
Patented July 9, 1957

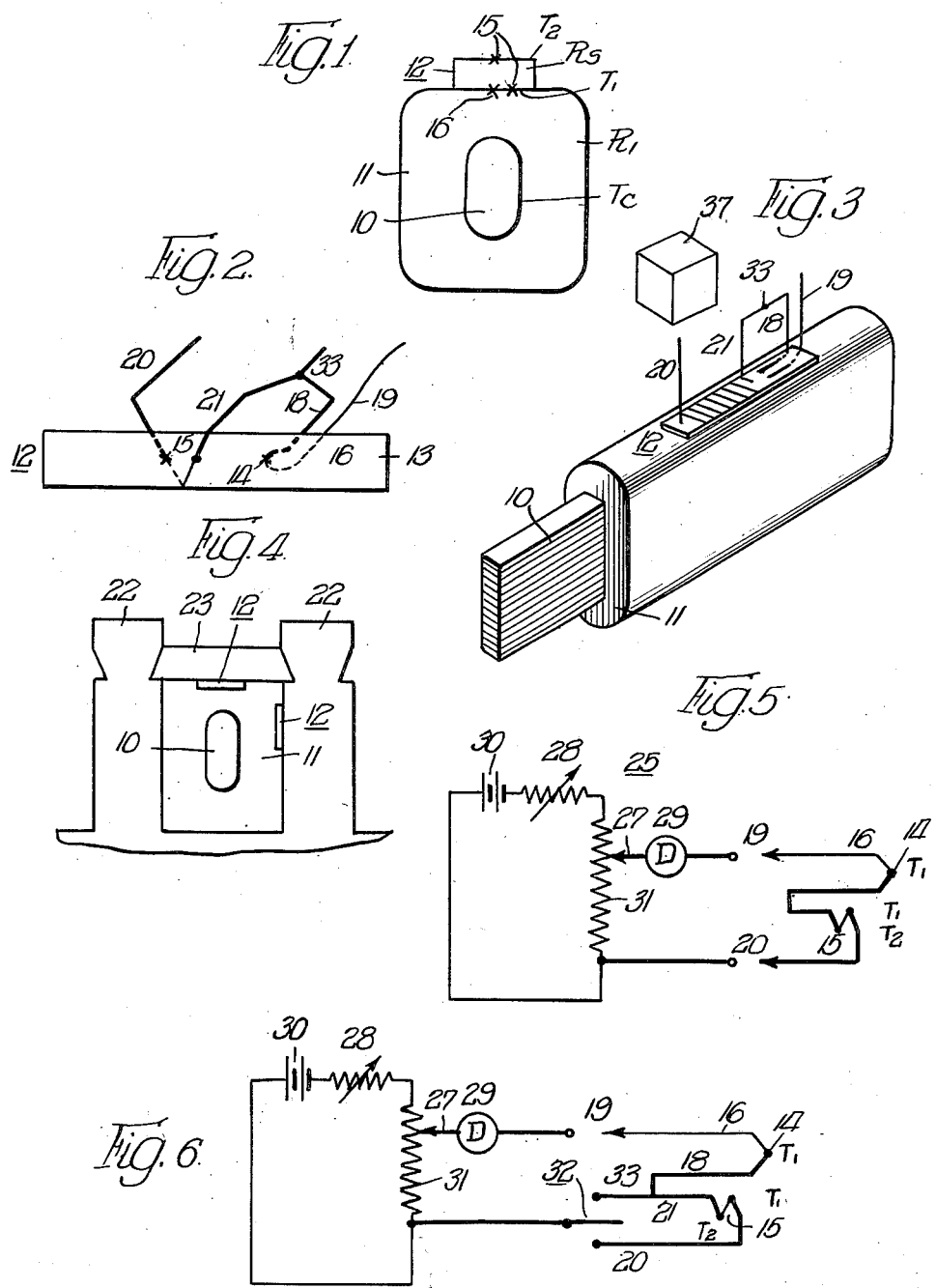

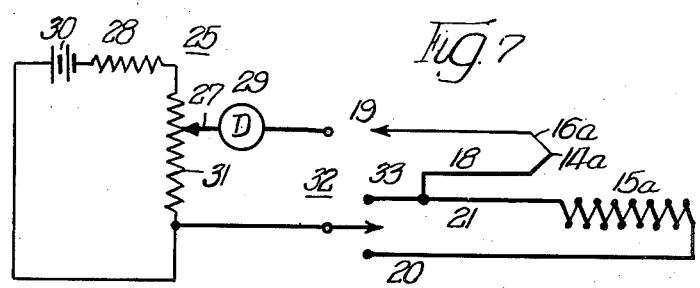
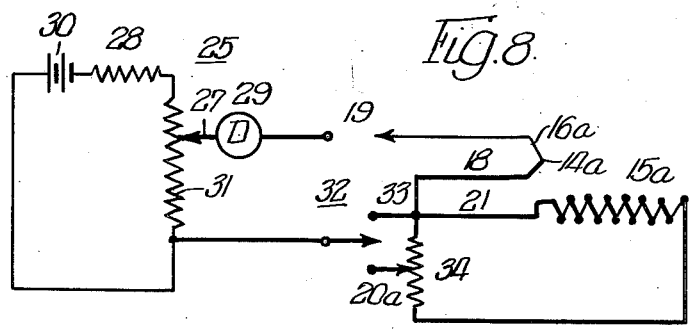
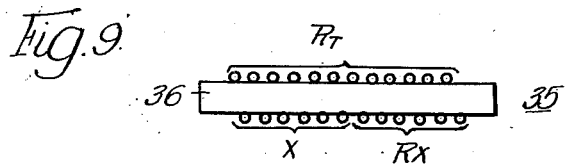
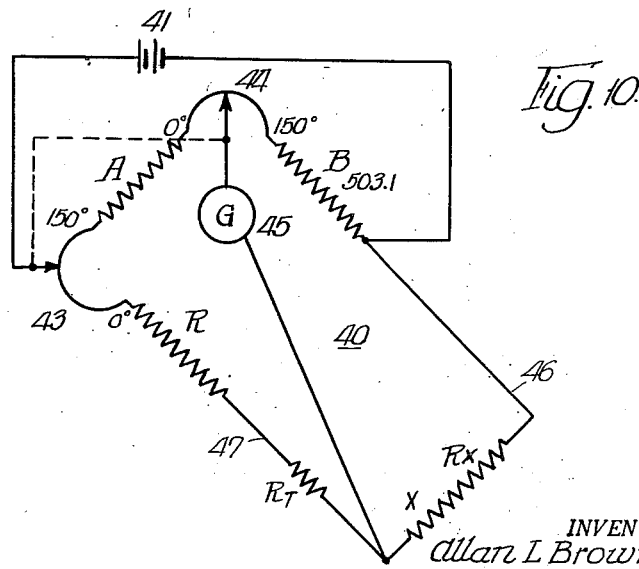

2,798,377

APPARATUS FOR PROVIDING TEMPERATURE INDICATIONS OF INACCESSIBLE OBJECTS

Allan L. Brownlee, Chicago, and Homer E. Brown, Wilmette, Ill.

Application August 8, 1952, Serial No. 303,296

12 Claims. (Cl. 73—341)

The present invention relates to a novel apparatus for effecting accurate measurements of the temperature of materials which may be in a solid, liquid, or vapor form, and which are normally inaccessible to direct contact by a temperature measuring device.

In most fields of industry today, there exists the problem of obtaining an accurate measurement of the temperature of certain materials, which by reason of their enclosure within a housing, covering etc., are normally inaccessible to direct contact by suitable temperature measuring means. In heat chambers or furnaces, for example, the high temperatures of the units render the introduction of a temperature reading member therewithin impractical, and as a result, it is difficult to ascertain the exact temperatures within the furnace confines. In that the maintenance of a given temperature is a critical factor in the practice of many known processes and methods, the inability to provide accurate furnace temperatures in a consistent manner is a definite impediment to the successful utilization of these known processes and methods.

In other fields where fluid or gas carrying members are utilized for heating or cooling purposes, and especially those fields in which the fluids and gases are used under high pressures or unusual temperature conditions, the introduction of a temperature measuring device into the system was previously accomplished only by the utilization of intricate and expensive sealing arrangements, which at best, had a comparatively short life. The increased cost of such equipment and the added danger involved in the use thereof are definite disadvantages in the heating and cooling fields.

In still other branches of industry, it is frequently necessary to obtain the temperature of members located within hermetically sealed systems, many of which are so constructed as to prevent the introduction of a temperature measuring device therewithin. In other units which do permit the introduction of standard measuring means within the system, the heat patterns and relative heat transfers between members in the sealed system are such as to render inaccurate the readings obtained with known types of measuring instruments. There is, therefore, a definite need for a measuring device which is operative to measure the temperature of inaccessible objects and which is also operative to provide such measurements independent of ambient temperature conditions.

In the electrical field, the problem is one of determining the temperature of various members in electrical load generating and load carrying equipment independent of ambient temperature conditions. It is well known that the temperature of insulation of electrical members is critical, the insulation deteriorating very rapidly once the critical temperature is exceeded. It is therefore obvious that one of the limiting factors of loading an electrical system is the critical temperature of the insulating material, and that in order to obtain maximum efficiency in load distribution, it is necessary that the temperature of the conductor and the insulation adjacent thereto be known to the operator as the various loads are applied thereto.

Inasmuch as an insulated conductor is generally above ground potential, it is apparent that the introduction of a direct measuring temperature unit into the system would be dangerous. In other load conducting installations the cable members are of the submarine type which do not lend themselves to the use of direct temperature measuring means in the determination of the temperature of the conductors as various loads are applied thereto.

There is a definite need, therefore, in the electrical field, as well as in other fields, for a temperature measuring apparatus which is capable of providing an accurate measurement of the temperature of members which are located in a housing, encasement, wrapping or other form of enclosure which renders the member to be tested inaccessible to direct contact by any known types of temperature reading means.

It is a primary object of this invention to provide a novel apparatus for readily accomplishing the measurement of the temperature of members which are inaccessible by reason of an outer housing, and it is a specific object of the invention to provide a novel apparatus for providing such temperature measurements independent of ambient temperature conditions.

It is a further specific object of this invention to provide a novel apparatus for measuring the temperature of electric conductors surrounded by wrappings of insulation, such as used in electrical motors, generators, and other load carrying equipment. In the utilization of hydrogen cooling methods, new heat transfer and cooling patterns are experienced which can best be solved by the use of temperature measuring equipment which is operative independent of existing ambient conditions.

In the measurement of the temperature of the copper of a coil for an electrical generator, for example, the accurate determination of the temperature of the copper must be accomplished independent of the temperature of the iron stators which lie adjacent three sides thereof and the Bakelite wedge which lies adjacent the fourth side. The obvious differences in the conducting ability of the material which lies adjacent the coil and the difference in the transfer of heat by these materials renders the determination of the true temperature of the coil copper extremely difficult. This difficulty is further amplified by the fact that in many instances reverse heat flow paths may exist; that is, the adjacent iron stators may be heated to a point where the heat flows through the insulation toward the copper conductor instead of from the copper conductor to the adjacent iron. Reverse heat flow patterns of this type are not detectable by any known types of temperature measuring means, and as a result serious and expensive equipment breakdown have resulted.

A feature of the invention is the manner in which the temperature of the members is provided substantially independent of the various heat flow paths which may extend in several directions from the member, and the manner in which the apparatus actually detects the existence of a reverse heat flow pattern in the electrical equipment under test.

These and other objects and features of the invention will become apparent with reference to the following specification, claims and drawings in which:

Figure 1 is a cross sectional view of a measuring element of the invention as mounted on the outer wrapping of insulation of a copper coil for temperature observation purposes, Figure 2 is a top plan view of one embodiment of the novel measuring element in which thermal junction members are used for effecting the measurement of temperature and a temperature difference value, Figure 3 is a persepctive view of a measuring element of the thermal junction type mounted on an insulated copper coil for copper temperature measuring purposes, Figure 4 is a cross sectional view showing a measuring element as mounted to provide temperature measurements of a stator coil in an electric generator unit, Figures 5 and 6 are circuit schematic diagrams of one embodiment of the apparatus for providing direct temperature indications for installations in which the thermal resistances of the measuring element and housing members are equal, Figures 7 and 8 are schematic diagrams of a second embodiment for providing direct temperature indications for an installation in which the thermal resistance of the measuring element and the housing member are of different values, Figure 9 is a cross sectional view of a second embodiment of a measuring element in which copper resistance coils are used to provide the temperature measurements, and Figure 10 is a schematic diagram of one form of direct indicating apparatus utilized in conjunction with the measuring element of Figure 9.

GENERAL DESCRIPTION

One novel method of measuring the temperature of matter which is inaccessible by reason of its enclosure within a housing or other type enclosure basically comprises the steps of positioning a member adjacent an outer surface of the housing, measuring the temperature of the outer surface of the housing, measuring the temperature at the outer surface of the attached member, comparing same to determine the temperature difference at the surface of the attached member, and adding same to the temperature at the surface of the housing.

Such method puts into practice the proposition that the difference of temperatures between any two points in or on a material indicates a heat flow between the points, the amount of heat flow being proportional to the difference in temperature on either side thereof and the thermal resistance of the material. Thus, if two materials of the same thermal resistance and thickness are placed in contact so that the same heat flows through both, and the temperature drop across one is measured, the temperature drop across the other will be the same value. The addition of the temperature drop, as thus determined, to the temperature at the outer surface of the housing member, will therefore provide the true temperature of the member inside the housing.

According to a further embodiment of the invention, the housing and the adjacent member may be of different thermal resistivities (or the same thermal resistivity and different thicknesses). In such arrangement an interpolation step is included in the practicing of the method, the step comprising the interpolation of the measured temperature difference in accordance with the ratio of the thermal resistance of the housing and that of the member.

In another embodiment the method of measuring the temperature of matter which is inaccessible by reason of its enclosure within a housing or other type enclosure basically comprises the steps of positioning a member adjacent an outer surface of the housing, measuring the temperature of the outer and inner surfaces of the attached member, comparing same to determine the temperature difference at the surfaces of the attached member, interpolating same in accordance with the relative ratios of the thermal resistivities of the strip and the housing, and adding same as doubled to the temperature at the outer surface of the strip. Assuming the thermal resistance of the member to be equal to that of the housing, such method provides the true temperature of the inaccessible matter, the temperature of inaccessible matter may be determined when the thermal resistivities of the housing and the member are different by interpolating the temperature difference in accordance with the value of $k$.

Other methods for determining the temperature of inaccessible objects will be apparent from the foregoing disclosures which are considered to be within the scope of this invention.

With reference now to Figure 1, there is shown thereat a copper core member 1 which is completely encased by insulation 11 whereby direct access to the copper core by a conventional measuring device is rendered impractical. In accordance with the teaching of the first of the methods set forth above, a measuring element 12 is mounted on the outer surface of the insulation 11, the element comprising a strip of material having a first temperature measuring element 16 for determining the temperature at the outer surface of the insulation 11 (or the inner surface of the strip), and a second temperature measuring element 15 for determining the temperature drop across the strip, i. e., the difference between temperatures $T_1$ and $T_2$. Assuming the thermal resistivities of the insulation 11 and the strip are the same, temperature $T_1$ at the contacting surfaces of the insulation 11 and the strip is added to the temperature drop across the strip whereby $T_c$ (the temperature of the inaccessible object) is provided.

In the event that the thermal resistivities of the insulation 11 and the strip are of a different value, interpolation of the temperature difference which exists across the strip is made in accordance with the ratio of the thermal resistance of the insulation to that of the strip, thus $T_c = T_1 + (T_1 - T_2)(k)$ where $k$ is the ratio of the thermal resistance $R_i$ of the insulation to the thermal resistance $R_s$ of the strip.

In practicing a further method of the disclosure the temperature $T_1$ and $T_2$ at the inner and outer surfaces of the strip respectively are determined, the difference between temperature $T_1$ and $T_2$ is computed, and this value is multiplied by the factor $k+1$ and added to the temperature $T_2$ at the outer surface of the strip.

In practicing the last described method, if the thermal resistivities of the strip $R_s$ and of the housing $R_i$ are different, the further step of multiplying the temperature difference by factor $k$ is included, factor $k$ being, as above, the ratio of the thermal resistivities of the strip and the housing member.

APPARATUS

(a) Thermopile-thermocouple measuring device

The apparatus utilized in the practice of the foregoing methods may be of several alternative forms, one novel form of apparatus, as shown in Figure 2, comprising a measuring element 12 including a strip of material 13 of known thermal resistance, which may be of most any shape which will lend itself to convenient use with the member to be tested. In most instances the member 13 will comprise a flat strip, such as shown in Figure 2.

A conventional thermocouple 16 comprising a constantan wire member 19 and a copper wire member 18 has its coupling point 14 mounted at one surface of strip 13, and in one embodiment, on the particular surface of the strip 13 which is to be placed in contact with the outer surface of the housing 11 for the enclosed member 10. The constantan wires of the thermocouple members are illustrated in the figures by the lighter lines and the copper wires in the thermocouple members are indicated by the heavier lines. The output of the thermojunction 14 of thermocouple 16 is extended to associated equipment over conductors 33 and 19. The strip element also mounts a thermopile 15, comprising two thermocouples in the present example, which are mounted to measure the temperature drop across the strip, and to extend such measurement over conductors 20 and 21.

The strip element 13 will always mount an odd number of thermal junctions, the number of junctions on a strip being determined by the formula $N = 2k+1$, where $k$ is the ratio of the thermal resistance of the housing to the strip;

$$k = \frac{R_i}{R_s}$$

In arrangements in which the thermal resistance of the strip and the housing are equal, the value of $k$ will be one, and the number of thermal junctions will be $N=2+1$ or $N=3$. This is the minimum number of thermal junctions any unit will have mounted therein.

As shown in Figure 2, two junctions $$\frac{(N+1)}{2}$$

are mounted on one side of the strip and one junction $$\frac{(N-1)}{2}$$

is mounted on the other side of the strip, making a total of three junctions thereon. Thermojunction 14 of thermocouple 16 which is mounted on the $$\frac{N+1}{2}$$

side is positioned to determine the temperature $T_1$ which exists at the contacting surfaces of the housing and strip, the thermojunction producing an E. M. F. which is proportional to the temperature $T_1$ thereat. The two other thermojunctions which are part of thermopile 15 and which are located on opposite sides of the strip, will generate in combination an E. M. F. which is proportional to the difference in temperatures $T_1$ and $T_2$. Assuming the thermal resistivity of the strip 13 is equal to the thermal resistivity of the housing 11, the temperature drop across the housing member will be the same as across the strip. Therefore, the extension of the quantity $(T_1-T_2)$ over conductors 20 and 21 by the thermojunctions of thermopile 15 and the extension of the quantity $T_1$ over conductors 18 and 19 by thermojunction 14 will provide the temperature $T_c$.

Measuring device 12 may also be constructed with the single thermal junction 14 placed on the outer surface of the element 13 to determine the temperature thereat, instead of in contact with the inner surface of the measuring element 13 as shown in Figure 2. In such arrangement a direct reading of the temperature of the inaccessible object is obtained by adding the temperature drop across the strip and the temperature drop across the housing to the temperature at the outer surface of the strip 12. The thermal resistivity factor for this structure is determined as follows, $$k = \frac{R_s + R_i}{R_s}$$

Assuming the thermal resistivities of the strip and of the housing are equal, $k=2$ and the number of thermojunctions necessary to provide a direct reading will be $N=2k+1$ or 5. Thermopile 15 will have four thermal junctions mounted on the strip and thermocouple 16 will have one thermal junction member mounted on the outer surface of the strip.

In the event that the thermal resistivities of the strip and the housing are of different values, the value of $k$ will vary and a corresponding change in the number of thermojunctions in the strip is necessary. For example, in Figure 7 the thermopile 15a there shown may comprise a first pair of junctions which represent the differences in the temperatures $T_1-T_2$, and the balance of the pairs of junctions in the thermopile 15a may represent the factor to compensate for the differences in the resistivities of the strip and the housing.

As shown in Figure 5 a conventional potentiometer system 25 may be used to indicate the output of the thermopile 15 and thermojunction 14. The potentiometer system 25 shown in Figure 5 may be any conventional unit, the apparatus comprising a source of potential 30, a detector 29, a zero adjusting resistance 28, and a variable resistance 31 which includes a slide arm 27 adapted to move along an indicator scale (not shown).

Briefly, as the E. M. F. output of the thermopile 15 and thermojunction 14 appear across conductors 19 and 20, the value of the resistance 31 is varied to adjust the E. M. F. until a balanced condition exists on the detector 27. As the point of balance is reached, the reading on the indicator scale associated with resistance 31 will be the actual temperature $T_c$ of the copper member 10.

As shown in Figure 6, by introducing a two-position switch 32 into the system, and connecting same so that one position will extend conductor 20 to the variable resistance 31, and so that the second switch position will alternatively extend a point between the thermojunction 14 and the thermopile 15 over a conductor 33 to the variable resistance 31, it is possible to provide a direct reading of temperature $T_1$ (which is the temperature at the outer surface of the insulation 11 as provided by thermojunction 14), or alternatively the temperature $T_c$ which is the temperature of the copper 10 as provided by the combined output of thermopile 15 and thermojunction 14.

The foregoing arrangements provide accurate and reliable readings of the temperature of inaccessible objects in installations in which the measuring element 12 has the same thermal resistivity as the housing member 11. However in installations where such arrangement is prevented by reason of space or other limitations, the thermopile 15 is constructed in accordance with the ratio of the thermal resistance of the enclosing member 11 to the thermal resistance of the strip 13. For example, in the measurement of the temperature of copper in a conductor located in generating equipment, there is a minimum amount of room available for the mounting of a measuring element 12, and the utilization in such arrangement of a measuring element which has the same thermal resistance as that of the surrounding insulation is frequently prevented by reason of the limited space available in the equipment.

The specific manner in which a measuring element 12 is used to determine the temperature of a load carrying coil in a generator unit is shown in Figure 3. The copper coil 10, there shown, is the coil of a load carrying generator which is normally disposed, as shown in Figure 4, between two adjacent iron stators 22 and which is wedged into place by a Bakelite member 23 adapted to cooperate with the wedge surfaces of the adjacent stators 22. The measuring element 12 may be mounted on any surface of the insulation 11 or if desired may be embedded in the insulation during manufacture of the machine. Any other manner of mounting will be obvious to the skilled party.

In the arrangement shown in Figure 4, one measuring element 12 is mounted on the insulation surface which lies adjacent one of the iron stators 22, and another is shown mounted on the surface which contacts the Bakelite wedge 23. Many other arrangements for providing temperature indications in various sections of the equipment will be apparent therefrom, the arrangement varying with the nature of the data to be obtained.

In one specific installation in which the first method of the disclosure was followed, a measuring element 12 was mounted adjacent the outer surface of a stator coil in an electrical generator which had a rated output of 30,000 kw. at 12,000 volts. The coil 10 had a cross section of approximately 1 x 2 inches, and the coil was surrounded by pressed mica in a thickness of approximately 210 mils. The strip member 12 was made of pressed mica insulation and was approximately ½ inch wide, 1 inch long and 30 mils thick.

Since the number of thermal junctions in any arrangement is determined by $N=2k+1$, and since the ratio of the thermal resistances of the insulation member and of the strip member in the above installation is $$\frac{R_i}{R_s} = \frac{210}{30} = 7$$

the number of thermojunctions is 15 (see Figure 7). Thermopile 15a has seven thermocouples. Inasmuch as each thermocouple of the seven in the pile will measure $(T_1-T_2)$, it is apparent that the pile will indicate seven times $(T_1-T_2)$. Thus, the output of thermopile 15a over conductors 19 and 20 will be indicative of the quantity $(T_1-T_2)k$; the output of the thermojunction 14a over conductors 19 and 33 will indicate $T_1$; and the combined ouput of the units 15a and 14a will indicate $k(T_1-T_2)+T_1$, which equals $T_c$, the temperature of the inaccessible copper member 10.

In most installations, the measuring element 12 may be constructed so that the value of $k$ will be an integer. In installations where such relation is difficult to provide, the apparatus may take the form shown in Figure 8. As there illustrated, a voltage divider unit 34 is connected in series with the thermopile 15a, whereby adjustment of the thermopile output may be made by effecting movement of the slider arm 20a thereon in a conventional manner. With suitable experimentation the output may be adjusted to effect a direct reading of $T_c$ even though $k$ is not a whole value.

*(b) Resistance-thermometer device*

A particular feature of the second embodiment of the invention is the manner in which commonly used temperature measuring arrangements may be readily modified for use in the practicing of the present invention.

With reference to Figure 9, there is shown thereat a measuring element 35 which is operative with the apparatus of Figure 10 to provide indications of the temperature of an inaccessible member. As there shown, the element comprises an insulation strip 36 having a first copper coil $R_t$ supported along its upper or outer surface, and a second copper element comprised of coils X and $R_x$ supported on its bottom surface, this surface of the strip 36 being the surface which is adapted to engage the outer surface of the housing which surrounds the member under test.

The resistance values of the coils $R_t$, X and $R_x$ are in part determined by the relative values of the thermal resistance of the material surrounding the member to be tested and the thermal resistance of the insulation strip 36. Other factors such as the values of the various members of the testing equipment must also be considered in the provision of a direct reading instrument as shown hereinafter.

With reference to Figure 10, there is shown thereat a somewhat conventional type copper resistance thermometer in which a Wheatstone bridge 40 supplied by a source of potential 41 is connected to provide direct readings of the copper temperature $T_c$ as controlled by the measuring element 35. The bridge 40 includes two mechanical slide wire members 43 and 44 which are tied together and are simultaneously movable in the same direction. The slide wire members 43 and 44 include suitable indicating plate members which provide direct readings of the temperature $T_c$ whenever detector 45 indicates a balanced bridge condition.

Two legs of the bridge include balancing resistors A and B, which are maintained in a 1:1 ratio by the sliders of slide wires 43 and 44; a third leg includes the resistance coil X, $R_x$ which is mounted on the measuring element 36, plus a conductor 46 which connects the resistance conductors lying on the one side of the element 35 in the bridge; and a fourth leg includes resistance coils $R_t$ and R plus the conductor 47 which connects the resistance conductors lying on the other side of the element 35 in the bridge. The resistance value of the two connecting conductors 46 and 47 must be equal.

In one specific arrangement the values of the various members in an instrument which was adapted to provide temperature readings $T_c$ over a range of from 0° to 150° centigrade were:

Resistance X—
    8.89 ohms at 0° C.
    10.00 ohms at 25° C.
Resistance $R_x$—
    8.89 ohms at 0° C.
    10.00 ohms at 25° C.
Resistance $R_t$—
    8.89 ohms at 0° C.
    10.00 ohms at 25° C.
Resistance R—
    8.89 ohms at 0° C.
    10.00 ohms at 25° C.
Slide wire 43—5.875 ohms ⎫
Slide wire 44—2.936 ohms ⎬ Temperature coefficient of
Resistance A—500.1 ohms ⎬ resistance practically zero.
Resistance B—503.1 ohms ⎭

Thus, with all parts of the element 35 at 0° centigrade, the value of resistance in the B leg of the bridge will be equal to 503.1 ohms (B) plus 2.936 ohms (slide member 44), or approximately 506 ohms. The resistance on the A arm will be 500.1 ohms (A) plus 5.875 ohms (slide member 43) or approximately 506.0 ohms. The resistance on the one leg including coils X, $R_x$ and the conductor 46 will be 8.89 ohms+8.89 ohms+the resistance of conductor 46, and the resistance on the arm including coils R, $R_t$ will be 8.89 ohms+8.89 ohms+the resistance of conductor 47.

It is apparent therefrom the opposite arms of the bridge have equal values of resistance, and the bridge is balanced. The slide wire scale of the apparatus shown in Figure 10 provides readings in the following order:

| R+ resistance inserted by Slide 43 | Scale Reading for $T_c$, degrees |
|---|---|
| 8.89 | 0 |
| 10.00 | 25 |
| 10.04 | 26 |
| 10.08 | 27 |
| 10.12 | 28 |
| ... | ... |
| 10.32 | 33 |
| 14.76 | 150 |

Assuming now that the temperature $T_c$ of an inaccessible element 10 which is shown in Figure 1 is 27° C., and that the temperature drop across the material 11 surrounding the element 10 is one degree, whereby the temperature $T_1$ is 26° C., it is apparent that with the use of a measuring element 35 in which the thermal resistance of the strip 36 is equal to that of the insulation 11, the temperature drop thereacross will be 1° and the temperature $T_2$ will be 250° C. The X, $R_x$ coils in such event are at a point where the temperature is 26° ($T_1$) and resistance $R_t$ is located in a position where the temperature ($T_2$) is 25°. The resistances of these members change with the change of temperature and the resistance of X, $R_x$ becomes 10.04 ohms each, and the resistance of $R_t$ becomes 10.00 ohms. This change in resistance will send the bridge out of balance, the balance being restored by adjusting slide number 43 and 44 to vary the resistance on the other three legs to compensate for the change and bring the bridge back to its balanced position. With reference to the temperature determining formula $$T_c = T_1 + (T_1 - T_2)$$

And by substitution therefore, $R+R$ of slide $43 = X + (R_x - R_t)$
    $= 10.04 + (10.04 - 10)$
    $= 10.08$ ohms From the scale above, it is apparent that the detector will indicate balance when the slide wire member 43 is adjusted to insert, with resistance R, 10.08 ohms in the bridge. At this point the arm of 43 will be positioned to read 27°, this being the temperature $T_c$ of the member 10.

In a similar manner the apparatus may be arranged to provide a direct reading of the temperature in installations in which the strip 36 has a thermal resistivity factor $k$ other than 1. Assuming that the factor $k$ is equal to 7 in a given arrangement, the value of resistance $R_x$ in constructing the coil is increased to a value which is seven times that of resistance X. Resistance $R_t$ is also made of a value seven times greater than resistance X. Thus, in an arrangement in which resistance X is 10 ohms, $R_x$ and $R_t$ must each be 70 ohms in value.

By way of example, with the temperature $T_c$ of an inaccessible member 10 at 33° C., and the temperature $T_1$ at the outer surface of insulation 11 at 26° C., in an arrangement in which the ratio of the thermal resistance of the strip 35 to that of the insulation is 1:7, the temperature $T_2$ will be 25° C. The resistance values of the coil on the measuring element 35 will be $R_x = 70.28$ ohms $(T_1 = 26°)$; $R_t = 70.00$ ohms $(T_2 = 25°)$; $X = 10.04$ ohms $(T_1 = 26°)$. Therefore $R + $ resistance inserted by slide $43 = x + (R_x - R_t)$ (Resistances $R_x + R_t$ having been provided in accordance with the value of $k$)

$$= 10.04 + 70.28 - 70.00$$
$$= 10.32 \text{ ohms}$$

By reference to the foregoing table, it will be apparent that with movement of the slide member to insert the value of resistance whereby $R + $ member $43 = 10.32$ ohms, the scale reading of $T_c$ will be 33°. Thus, a direct reading of the temperature of the inaccessible member 10 is provided.

It is noticed that the values of the resistances of the measuring element and bridge arrangement may be varied with different apparatus to provide various ranges of operation, the primary relations to be observed including the provision of coils $R_t$ and $R_x$ of equal value; the value of same being $(k)$ $(X)$ where $$k = \frac{R_i}{R_s}$$

The use of a 10 ohm resistance at 25° C. for resistance X was assumed in the illustrated examples in that many existing generator units have a coil of this value mounted therewithin for measuring purposes and the modification of same may be readily effected by the connection of resistors $R_t$ and $R_x$ in the bridge by conductors of equal value according to the invention taught hereinbefore.

CONCLUSION

There has been set forth hereinbefore a novel temperature measuring device which provides the solution to numerous problems in temperature measuring operations. The ability to obtain the temperature reading of materials that are inaccessible to direct contact measuring means makes possible more accurate control of various types of equipment and more reliable supervision thereof. As a result the equipment which formerly was used at only a fraction of its capacity is now available for increased performance which additionally results in the provision of improved operation and performance on an extremely economical basis, whereas the flexibility of the equipment lends same to ready use with most types of existing equipment.

An especial need for such equipment has existed heretofore in the electrical field, and the novel measuring means of the present invention is the answer to such need. Through the use of the novel apparatus, load carrying electrical equipment may now be safely loaded to maximum capacity and the danger of equipment breakdown by reason of undiscovered excessive temperatures is practically eliminated. Further, the ability of the apparatus to detect reverse heat flow patterns is a safeguard which aids in the rapid determination of a dangerous load condition, and is a definite aid to the detection and elimination of equipment failures.

The disclosed device is believed to provide a more dependable type operating system, increased supervision, minimization of equipment breakdowns, and more economical utilization of existing equipment by reason of the increased control data which is directly provided.

These and other features of the apparatus, which are believed to be new, are set forth in the accompanying claims.

What is claimed is:

1. A temperature measuring device for measuring the temperature of an inaccessible object which is separated from the measuring device by an intermediate member of known thermal resistance, said device comprising a thermal conductive member having a surface arranged to contact an outer surface of said intermediate member, a first temperature responsive means operative to provide responses proportional to the temperature drop across a section of said thermal conductive member which has a thermal transmission factor equivalent to that of said intermediate member, a second temperature responsive means for providing responses proportional to the temperature at the portion of said section which is closest to said inaccessible object, and means connected to said first and second temperature responsive means for transmitting the responses provided by said first and said second means to associated temperature indicating means in additive relation to thereby provide a direct indication of the temperature of said inaccessible object.

2. A temperature measuring device for measuring the temperature of matter which is separated from the measuring device by an intermediate member comprising a thermal conductive element adapted to be mounted in contacting relation with a surface of said intermediate member, the thermal resistance of said intermediate member and said thermal conductive element being of a predetermined ratio $k$, a first thermal electrical means supported by said element operative to provide an electrical response which is proportional to the temperature drop across said element times said factor $k$, a second thermal electrical means supported by said element operative to provide an electrical response which is proportional to the temperature at said surface of said intermediate member, and circuit means connected to said first and second means to transmit the response of said first and second means to associated indicating equipment in an algebraically additive manner to provide an indication of the temperature of said inaccessible object.

3. A device as set forth in claim 2 in which said element mounts at least three thermal junctions.

4. A temperature measuring device for measuring the temperature of matter which is separated from the measuring device by an intermediate member comprising a thermal conductive element adapted to be mounted with one of its surfaces in contacting relation with a surface of said intermediate member, the thermal resistivity of said intermediate member and said thermal conductive element being of a predetermined ratio $k$, a first thermal electrical means supported by said element operative to provide an electrical response proportional to the temperature at said one surface of said element, a second thermal electrical means supported by said element operative to provide an electrical response proportional to the temperature drop across said element times said factor $k$, means for algebraically adding the electrical responses of said first and second means, additional means for modifying the algebraic sum of the electrical responses of said first and second means, and means for transmitting the modified output to associated indicating means.

5. A temperature measuring device for measuring the temperature of matter which is separated from the measuring device by an intermediate member comprising a thermal conductive element adapted to be mounted in contacting relation with a surface of said intermediate member, the thermal resistance of said intermediate member and said thermal conductive element being of a predetermined ratio $k$, a first thermal electrical means supported by said element operative to provide an electrical response which is proportional to the temperature drop across said element times the factor $k+1$, a second thermal electrical means supported by said element operative to provide an electrical response which is proportional to the temperature at an outer surface of said thermal conductive element, and circuit means connected to transmit the responses of said first and second temperature measuring devices to associated indicating means in algebraically additive manner to provide an indication of the temperature of said inaccessible object.

6. In a temperature arrangement for measuring the temperature of matter which is separated from the measuring device by an intermediate member and for determining the direction of heat flow through said intermediate member, a thermal conductive element adapted to be mounted in contacting relation with an outer surface of said intermediate member, the thermal resistivity of said intermediate member and said thermal conductive element being of a predetermined ratio $k$, a first measuring device mounted on said element for providing a response proportional to said ratio $k$ times the difference between the temperature at the outer surface of said intermediate member and the temperature on the outer surface of said element, a second measuring device disposed on said element to contact an outer surface of said intermediate member operative to provide a response proportional to the temperature thereat, circuit means for algebraically adding the output responses of said first and second measuring devices together to provide an indication of the temperature of said inaccessible object, indicating means, and switching means in said circuit means operable to a first position to transmit the indications of said second measuring device to said indicating means to provide a direct reading of the temperature at the outer surface of said intermediate member, and alternatively to a second position to connect the combined output of said first and second measuring devices to said indicating means to provide a direct reading of the temperature of said inaccessible member, whereby the direction of heat flow through the intermediate member and element is readily ascertained.

7. A temperature measuring device for measuring the temperature of matter which is separated from the measuring device by an intermediate member, said device comprising a thermal conductive element adapted to be mounted in contacting relation with an outer surface of said intermediate member, the thermal resistivity of said intermediate member and said thermal conductive element being of a predetermined ratio $k$ which is not less than one, a thermopile comprising a plurality of thermocouple elements serially connected and mounted on said element with the hot junctions thereof disposed to respond to the temperature at the outer surface of said intermediate member, the cold junctions of said thermocouples being disposed on the opposite side of said element to respond to the temperature at the outer surface of said element, the number of said thermocouple elements being determined by said ratio $k$, whereby the output of said thermopile is proportional to the temperature drop across said element times said ratio $k$, a single thermal junction mounted on said element disposed to contact the outer surface of said intermediate member and to provide an E. M. F. output which is proportional to the temperature thereat, and means connected to transmit the output of said thermopile and said thermal junction to associated means in an algebraically additive manner to thereby provide an E. M. F. output which is indicative of the temperature of said inaccessible object.

8. A device as set forth in claim 7 in which the thermal resistances of said intermediate member and said element are equal, and said first temperature responsive means comprises two thermocouple elements and said second temperature responsive means comprises a single thermal junction.

9. A temperature measuring device for measuring the temperature of matter which is separated from the measuring device by an intermediate member having a known thermal resistance factor, said device comprising a thermal conductive element adapted to be mounted in contacting relation with an outer surface of said intermediate member and having a thermal resistance factor of a predetermined ratio to that of said intermediate member, the ratio of their values being expressed as a constant $k$; a plurality of thermal junctions on said strip which are equivalent in number to $2k+1$, certain of said thermocouples being connected to provide an E. M. F. response which is proportional to the temperature drop across said element times said factor $k$; and one of said thermal junctions being connected to provide a response proportional to the temperature at the contacting surface of said thermal conductive element and said intermediate member; and circuit means connecting the E. M. F. response of said one and said certain thermal junctions in an algebraically additive manner to provide an E. M. F. value which is indicative of the temperature of said inaccessible object.

10. A temperature measuring device for measuring the temperature of matter which is separated from the measuring device by an intermediate member, said device comprising thermal conductive means adapted to be mounted with one of its surfaces in contacting relation with a surface of said intermediate member, the thermal resistivity of said intermediate member and said thermal conductive means being of a predetermined ratio $k$, temperature measuring means associated with said thermal conductive means for determining the temperature drop across said thermal conductive means including a first and second resistance member mounted on said one surface of said thermal conductive means to be responsive to the temperatures thereat, the first and second resistance members having resistance-temperature characteristics in the ratio of said thermal resistivity ratio, and a third resistance member mounted on the outer surface of said thermal conductive means to be responsive to variations in the temperature thereat, said third resistance member having a resistance-temperature characteristic equal to that of one of said first two resistance members, circuit means connecting the resistances to provide a summation of said first and second resistances minus said third resistance giving an electrical response proportional to the temperature at the outer surface of said intermediate member plus the temperature drop across said thermal conductive means times said factor $k$, and indicating means cooperating with said circuit means.

11. An arrangement as set forth in claim 10 in which the element has a thermal resistivity equal to that of the intermediate member, and each of the three resistances have equal resistance-temperature characteristics.

12. A temperature measuring device for measuring the temperature of matter which is separated from the measuring device by an intermediate member, said device comprising a thermal conductive member adapted to be mounted in contacting relation with an outer surface of said intermediate member, the thermal resistance of said intermediate member and said thermal conductive member being of a predetermined ratio $k$, temperature measuring means associated with said thermal conductive means for determining the temperature drop across said thermal conductive member including a first and a second resistance member supported on one surface of said detector means to be responsive to the temperatures thereat the ratio of the resistance-temperature characteristics of said first and second resistance members being in the ratio of said thermal resistivity ratio, and a third resistance member mounted on the opposite side of said detector means to be responsive to variations in the temperature on said opposite side, the value of the resistance-temperature characteristic of said third resistance member being equal to the value of one of said first two members, circuit means for connecting said resistances to provide a total electrical response which is proportional to the algebraic sum of the temperature at the outer surface of said intermediate member plus the temperature drop across said thermal conductive member times said factor $k$, said circuit means including a resistance-thermometer of the Wheatstone bridge type which includes said first and second resistances connected in one leg thereof and said third resistance connected in an adjacent leg thereof, adjustable resistance means connected in a remaining leg for adjusting the bridge to balance, and means for indicating at balance the temperature of said inaccessible object.

References Cited in the file of this patent

UNITED STATES PATENTS

| | | |
|---|---|---|
| 1,528,383 | Schmidt | Mar. 3, 1925 |
| 2,635,468 | Field et al. | Apr. 21, 1953 |
| 2,681,573 | Brown | June 22, 1954 |

FOREIGN PATENTS

| | | |
|---|---|---|
| 630,230 | Great Britain | Oct. 7, 1949 |